(12) United States Patent
Li et al.

(10) Patent No.: US 11,193,527 B2
(45) Date of Patent: Dec. 7, 2021

(54) SUPPORTING DEVICE

(71) Applicants: BenQ Intelligent Technology (Shanghai) Co., Ltd, Shanghai (CN); BENQ CORPORATION, Taipei (TW)

(72) Inventors: Chih-Wen Li, Taoyuan (TW); Chin-Fu Chiang, New Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 182 days.

(21) Appl. No.: 16/525,491

(22) Filed: Jul. 29, 2019

(65) Prior Publication Data
US 2020/0309188 A1    Oct. 1, 2020

(30) Foreign Application Priority Data

Mar. 26, 2019  (CN) .............................. 201910230559

(51) Int. Cl.
*F16C 11/04* (2006.01)
*F16M 13/02* (2006.01)

(52) U.S. Cl.
CPC ........... *F16C 11/04* (2013.01); *F16M 13/022* (2013.01); *F16M 2200/063* (2013.01)

(58) Field of Classification Search
CPC . F16C 11/04; F16M 13/022; F16M 2200/063; F16M 2200/022; F16M 11/2014; F16M 11/08; Y10T 403/32819; Y10T 403/32319; Y10T 403/32836; E05D 7/1016; E05D 7/105; E05D 7/10; E05D 7/1005; E05D 7/1044; E05D 2007/1027
(Continued)

(56) References Cited

U.S. PATENT DOCUMENTS 2,238,581 A * 4/1941 De Lisle ................... B43L 7/02
                                                                  33/468
4,480,809 A * 11/1984 Healey ................... F16M 11/10
                                                                248/185.1
(Continued)

FOREIGN PATENT DOCUMENTS

CN         206904541 U       1/2018
CN         207921685 U       9/2018
(Continued)

*Primary Examiner* — Kimberly T Wood
(74) *Attorney, Agent, or Firm* — Winston Hsu

(57) ABSTRACT

A supporting device includes a first and a second support, a fixed washer, and a threaded fastener. The first support has a threaded structure extending along a rotation axis, and a first engaging structure. The second support is pivotally connected to the first support relative to the rotation axis and has a through hole aligning with the threaded structure. The fixed washer includes a washer portion and a second engaging structure. The washer portion is disposed on the second support and aligns with the through hole. The second engaging structure passes through the through hole to engage with the first engaging structure. The threaded fastener presses against the washer portion and passes through the washer portion and the through hole to engage with the threaded structure. When the second support and the first support rotate relatively, the fixed washer and the first support remain fixed relative to the rotation axis.

7 Claims, 6 Drawing Sheets

(58) Field of Classification Search
USPC ..... 248/278.1, 281.11, 282.1, 284.1, 289.11, 248/285.1, 297.3, 277.1, 274.1; 411/160, 411/163; 16/261, 262, 263, 264, 265, 16/266
See application file for complete search history.

(56) References Cited

U.S. PATENT DOCUMENTS

| | | | | |
|---|---|---|---|---|
| 5,154,382 | A * | 10/1992 | Hoshino | F16C 11/103 248/185.1 |
| 7,540,457 | B2 * | 6/2009 | Oddsen, Jr. | F16M 11/105 248/278.1 |
| 9,377,157 | B1 * | 6/2016 | Kilgore | G03B 17/561 |
| 2001/0032916 | A1 * | 10/2001 | Wess | F16M 11/18 248/349.1 |
| 2005/0284997 | A1 * | 12/2005 | Tisbo | F16M 13/022 248/276.1 |
| 2006/0266909 | A1 * | 11/2006 | Oddsen, Jr. | F16M 11/2092 248/371 |
| 2009/0212184 | A1 * | 8/2009 | Bourgeois | F16M 11/2014 248/288.11 |
| 2010/0214729 | A1 | 8/2010 | Dittmer | |
| 2010/0236023 | A1 * | 9/2010 | Wang | F16M 11/10 16/342 |
| 2010/0243781 | A1 * | 9/2010 | Hayashi | A01K 89/006 242/224 |
| 2010/0327129 | A1 * | 12/2010 | Chen | F16M 11/2092 248/121 |
| 2011/0079692 | A1 * | 4/2011 | Li | F16M 13/022 248/220.21 |
| 2012/0193488 | A1 * | 8/2012 | Chung | F16M 11/24 248/201 |
| 2013/0221174 | A1 * | 8/2013 | Sapper | F16M 13/022 248/218.4 |
| 2014/0030006 | A1 * | 1/2014 | Lee | E04H 15/50 403/116 |
| 2014/0367137 | A1 * | 12/2014 | Leung | F16M 11/2014 174/68.3 |
| 2016/0192778 | A1 * | 7/2016 | Shen | A47B 21/0314 108/42 |
| 2017/0136923 | A1 * | 5/2017 | Delling | B60N 2/682 |
| 2017/0261034 | A1 * | 9/2017 | Sivinski | A01C 7/08 |
| 2017/0343154 | A1 * | 11/2017 | Burmester | F16M 11/2014 |
| 2019/0176703 | A1 * | 6/2019 | Henion | B60R 1/12 |
| 2019/0369664 | A1 * | 12/2019 | Peters | F16M 13/022 |
| 2020/0191321 | A1 * | 6/2020 | Kleist | F16M 11/10 |
| 2020/0216116 | A1 * | 7/2020 | Backulja | F16B 19/02 |
| 2020/0307764 | A1 * | 10/2020 | Padovani | B64C 7/00 |

FOREIGN PATENT DOCUMENTS

| | | | |
|---|---|---|---|
| CN | 208331638 U | 1/2019 | |
| GB | 631486 A * | 11/1949 | ............ B26B 13/28 |

* cited by examiner

SUPPORTING DEVICE

BACKGROUND OF THE INVENTION

1. Field of the Invention

The present invention relates to a supporting device, and more particularly to a supporting device with a movable joint.

2. Description of the Prior Art

Many supporting devices (e.g. for supporting monitors) use a multi-sectional supporting structure for provide adjustable supporting to the monitor thereon. Each support is usually pivotally connected to adjacent supports and is fastened with screws, so as to fix the angles relative to the adjacent supports. If an adjustment on the relative angle of the support is required, the screw needs to be loosened first in principle. Then the support can be rotated until the relative angle reaches a required value. The screw is screwed tight again for fixing the support. The screw uses frictional force to fix the supports pivotally connected with each other, so the supports still can be forced to rotate relatively. For this case, the rotating support probably rotates the screw to be loosened, which reduces the fastening effect of the screw to the support, even making it failed.

SUMMARY OF THE INVENTION

The present invention provides a supporting device that uses a structural engagement of a washer with a support to keep the washer fixed relative to the support, so as to avoid the loosening problem of the support in the prior art.

A supporting device according to the invention includes a first support, a second support, a fixed washer, and a threaded fastener. The first support has a threaded structure and a first engaging structure. The threaded structure extends along a rotation axis. The second support is pivotally connected to the first support relative to the rotation axis and has a through hole. The fixed washer includes a washer portion and a second engaging structure. The washer portion aligns with the through hole and is disposed on the second support. The second engaging structure passes through the through hole to be engaged with the first engaging structure. The threaded fastener presses against the washer portion and passes through the washer portion and the through hole to be engaged with the threaded structure. Thereby, when the second support rotates relative to the first support, the fixed washer and the first support can remain fixed relative to the rotation axis, so that the threaded fastener will not be rotated together with the second support. In other words, the supporting device according to the invention can effectively solve the problem in the prior art that the screw will be loosened due to the relative rotation of the supports.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
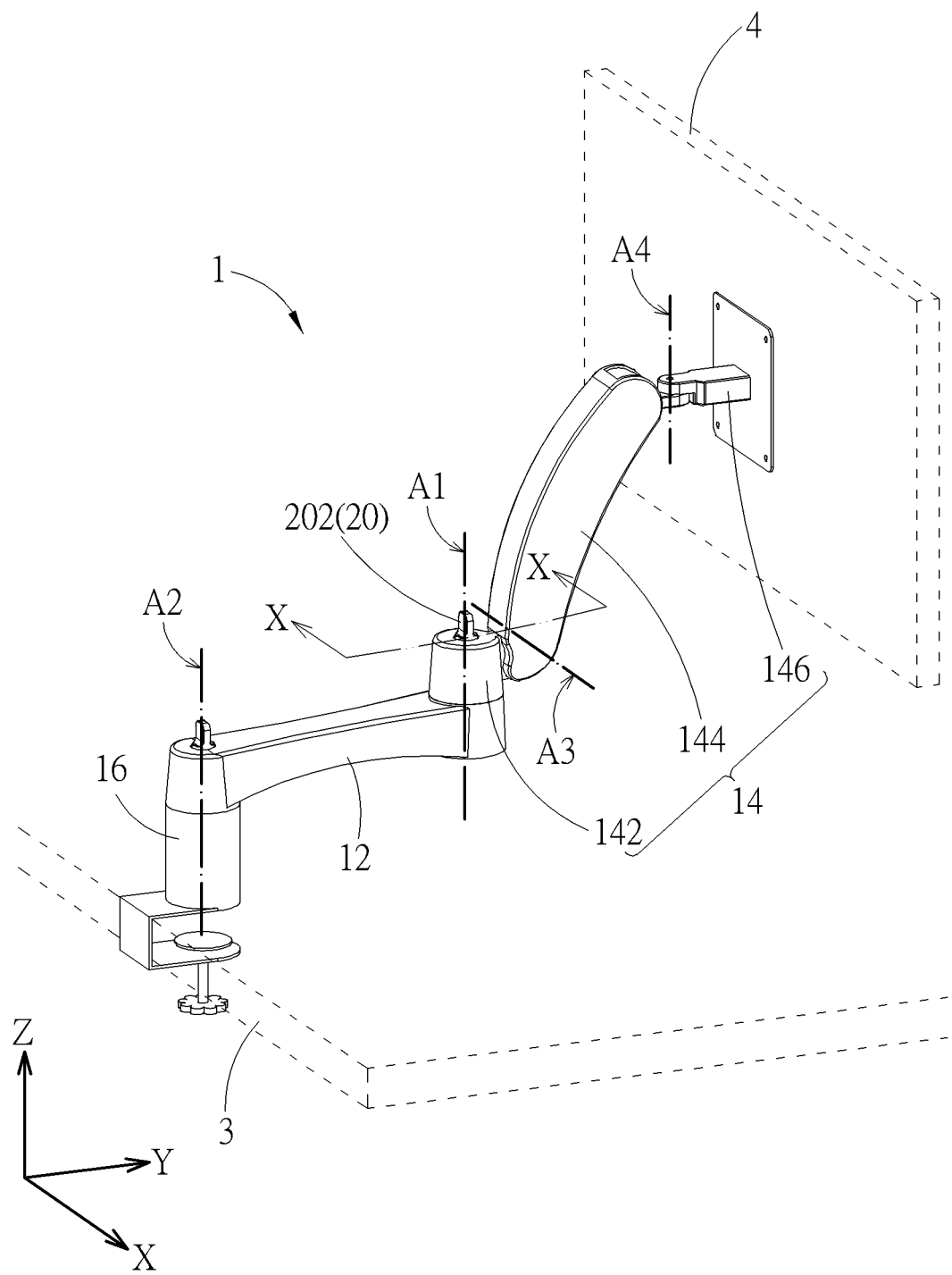
FIG. 1 is a schematic diagram illustrating a supporting device according to an embodiment.
Figure 2:
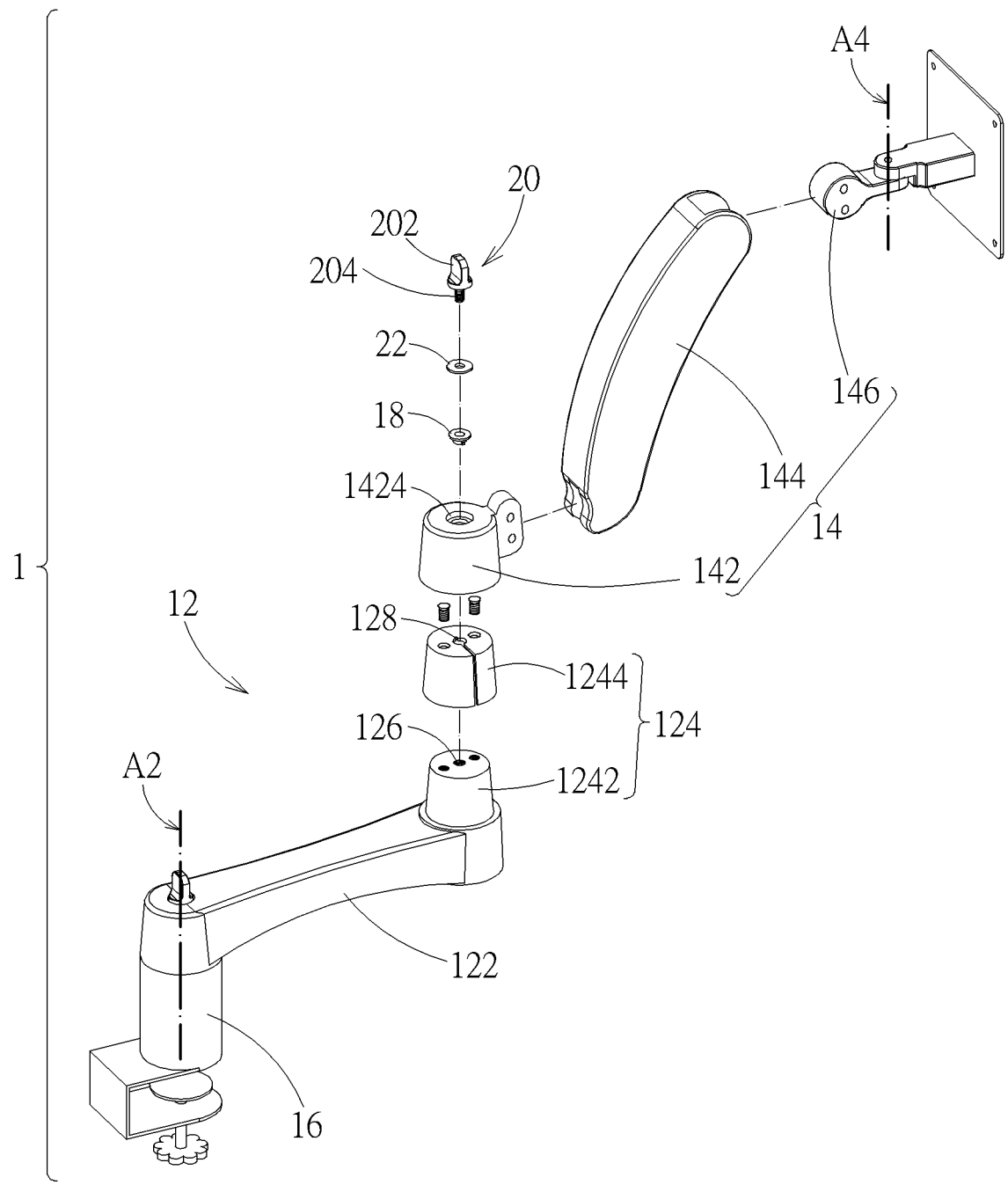
FIG. 2 is a partially exploded view of the supporting device in FIG. 1.

Please refer to FIG. 1 and FIG. 2. A supporting device 1 according to an embodiment is fixed at a table edge 3 (shown by dashed lines in FIG. 1). A monitor 4 (shown by dashed lines in FIG. 1) is fixed and supported on the supporting device 1. The position and orientation of the monitor 4 can be adjusted through the supporting device 1. In the embodiment, the supporting device 1 includes a first support 12, a second support 14, and a third support 16. The first support 12 is pivotally connected to the second support 14 relative to a first rotation axis A1 (indicated by a chain line in FIG. 1). The first support 12 and the third support 16 are pivotally connected with each other relative to a second rotation axis A2 (indicated by a chain line in FIG. 1). The supporting device 1 fixes and supports the monitor 4 through the second support 14 (e.g. that offers a mount in accordance with VESA Mounting Interface Standard) and is fixed at the table edge 3 through the third support 16 (e.g. of which an end has a C-shaped clamp). By the above pivotally connecting mechanism, the projection position of the monitor 4 on the X-Y plane can be adjusted.

Figure 3:
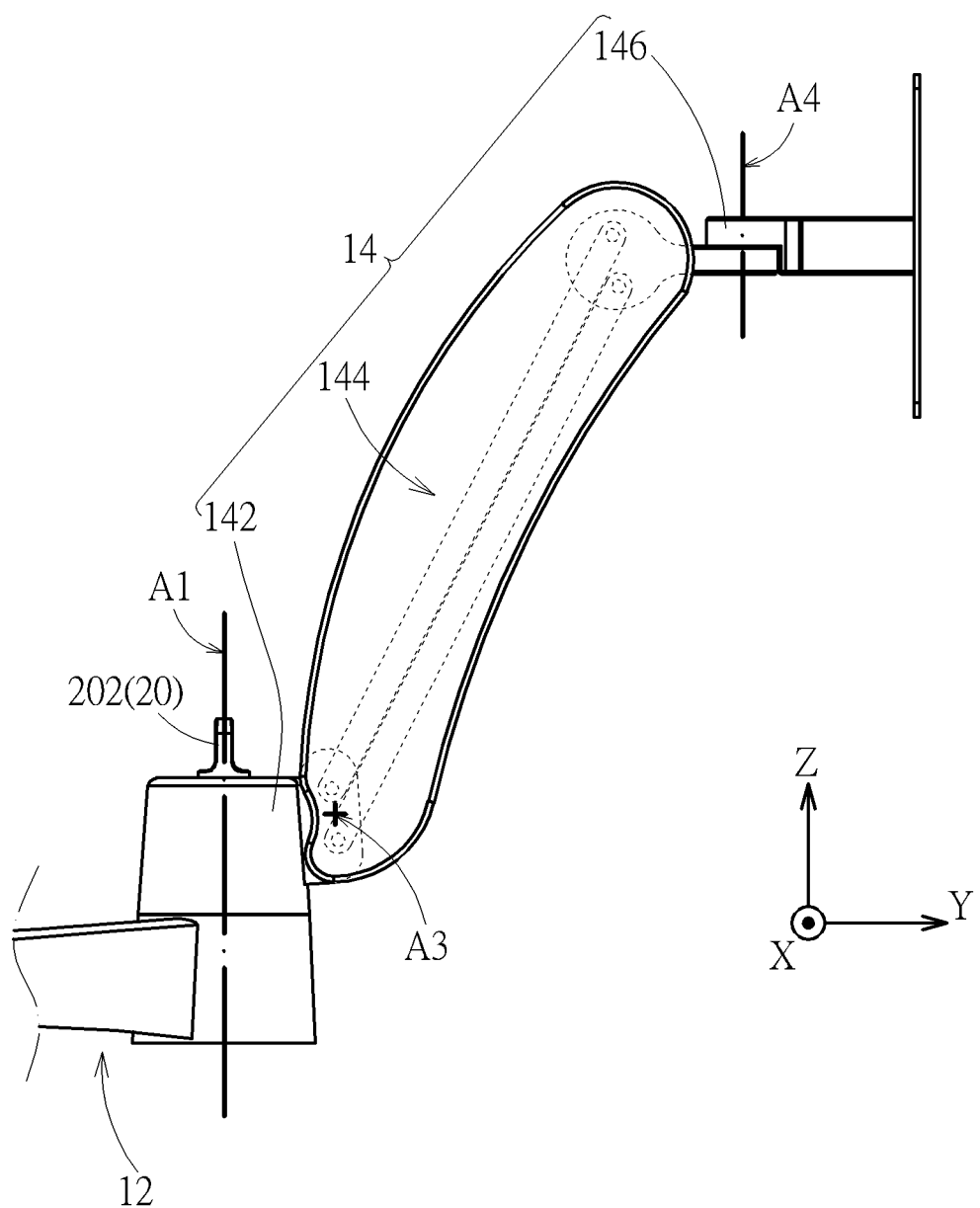
FIG. 3 is a side view of a first support and a second support in FIG. 1.

In the embodiment, the second support 14 includes a pivotal connection portion 142, a linkage portion 144, and a supporting portion 146. The second support 14 is pivotally connected to the first support 12 through the pivotal connection portion 142. The linkage portion 144 connects the pivotal connection portion 142 and the supporting portion 146 and can rotate relative to the pivotal connection portion 142 around a third rotation axis A3 (indicated by a chain line in FIG. 1). Thereby, the projection position of the monitor 4 on the Z-axis can be adjusted. In practice, as shown by FIG. 3, the linkage portion 144 includes two links (of which the profiles are shown in dashed lines), each of which is pivotally connected to the pivotal connection portion 142 and the supporting portion 146, so as to form a parallelogram four-bar linkage so that the supporting portion 146 can keep the same angular posture as the pivotal connection portion 142 through the linkage portion 144. In other words, during the rotation of the second support 14 relative to the first support 12, the monitor 4 can keep the same orientation (i.e. the horizontal orientation as shown by FIG. 3).

Figure 4:
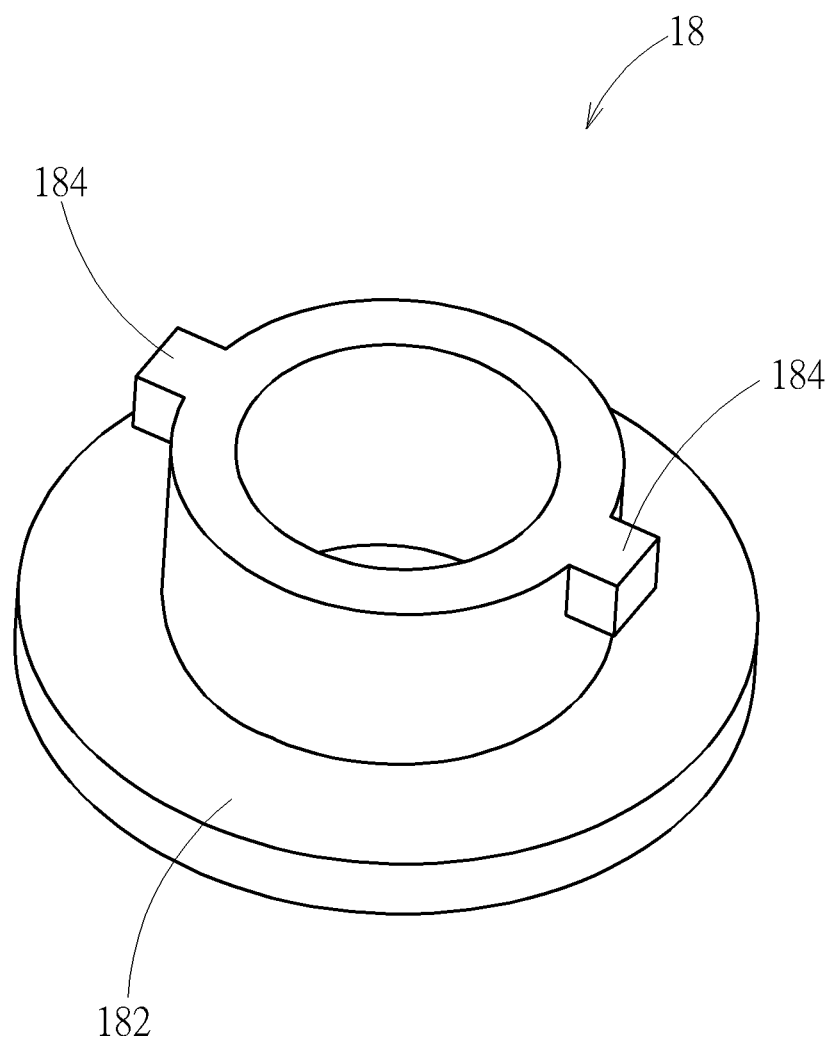
FIG. 4 is a schematic diagram illustrating a fixed washer in FIG. 2 in another view point.
Figure 5:
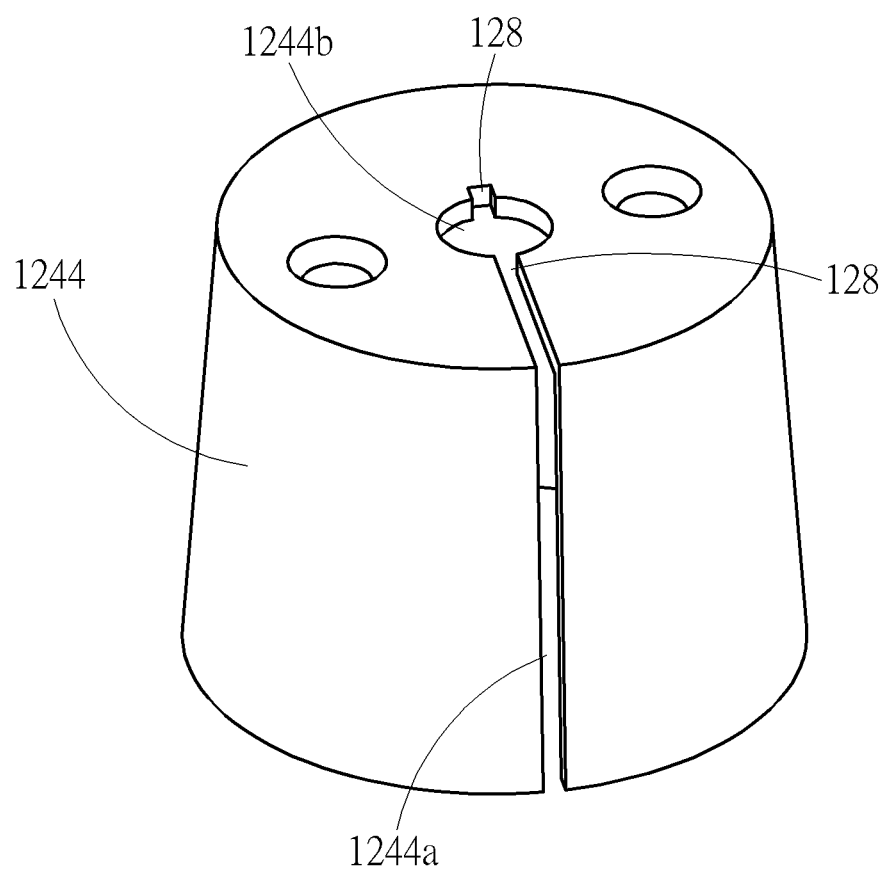
FIG. 5 is a schematic diagram illustrating a wear-resistant sleeve in FIG. 2.
Figure 6:
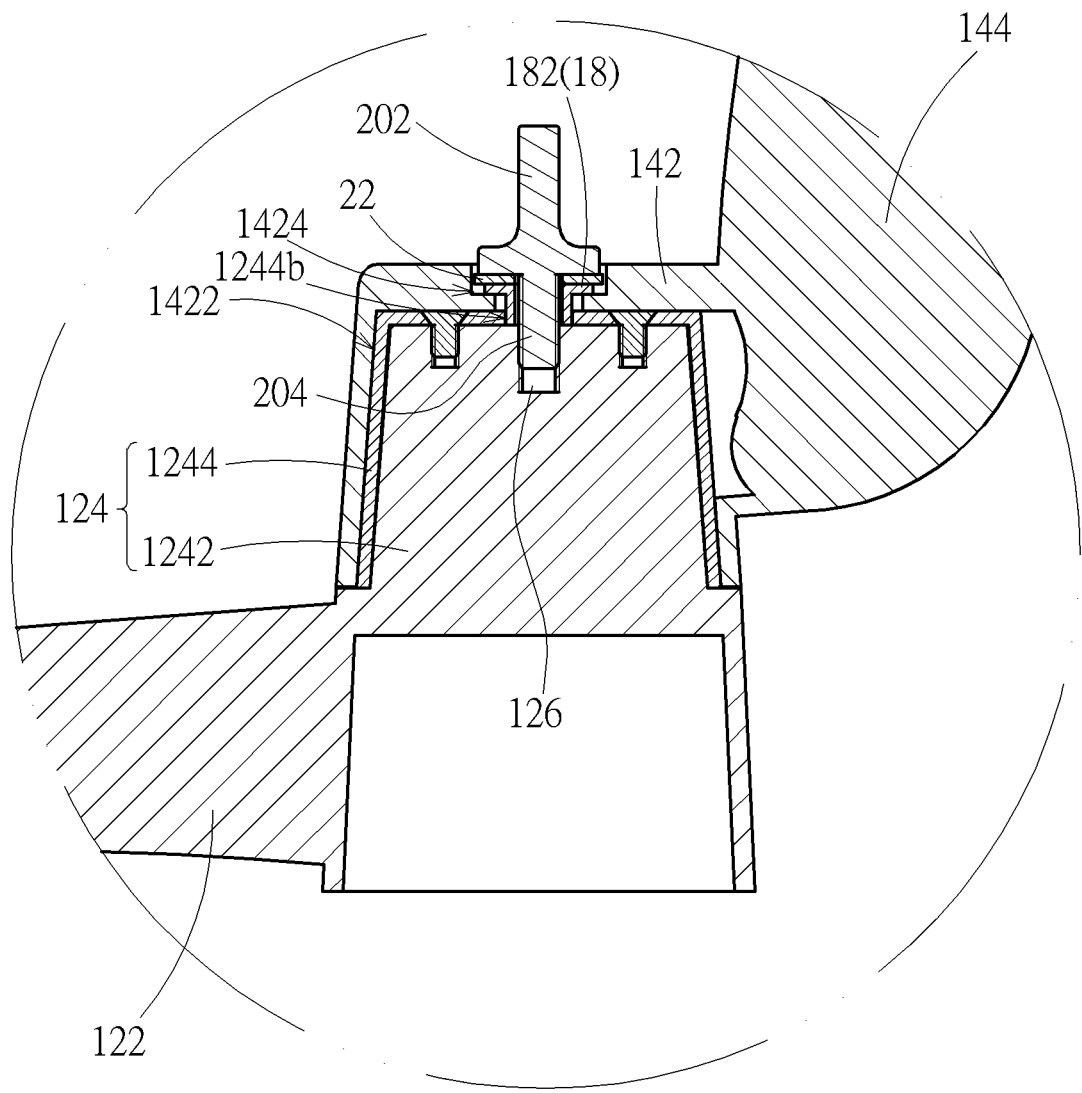
FIG. 6 is a section view of the supporting device along the line X-X in FIG. 1.

Please also refer to FIG. 4 to FIG. 6. In FIG. 6, for simplification of description, the second support 14 is shown by a single part. For the pivotal connection of the first support 12 with the second support 14, the first support 12 includes a support body 122 and a protruding shaft 124 disposed at an end portion of the support body 122. The pivotal connection portion 142 of the second support 14 includes a shaft socket 1422. The protruding shaft 124 and the shaft socket 1422 matches in profile. The shaft socket 1422 is rotatably sleeved on the protruding shaft 124 for achieving the pivotal connection of the first support 12 with the second support 14. Furthermore, in the embodiment, the protruding shaft 124 includes a shaft body 1242 and a wear-resistant sleeve 1244. The wear-resistant sleeve 1244 is sleeved on the shaft body 1242 (e.g. with a screw screwed on the shaft body 1242). The shaft socket 1422 is rotatably sleeved on the wear-resistant sleeve 1244, for reducing the abrasion between the shaft socket 1422 and the shaft body 1242. In practice, the material of the wear-resistant sleeve 1244 can be but not limited to POM. The wear-resistant sleeve 1244 can have an open slot 1244a, which is conducive to sleeve the wear-resistant sleeve 1244 on the shaft body 1242.

Furthermore, the first support 12 further includes a threaded structure 126 and a first engaging structure 128. The threaded structure 126 is disposed on the shaft body 1242 and extends along the first rotation axis A1 (i.e. the spiral axis and the first rotation axis A1 overlap). The first engaging structure 128 is disposed on the wear-resistant sleeve 1244. The wear-resistant sleeve 1244 has a through hole 1244b. The threaded structure 126 is exposed through the through hole 1244b. The pivotal connection portion 142 of the second support 14 further includes a through hole 1424 formed on the shaft socket 1422 (i.e. passing through the bottom of the shaft socket 1422) and aligns with the threaded structure 126. The supporting device 1 further includes a fixed washer 18 and a threaded fastener 20. The fixed washer 18 includes a washer portion 182 and a second engaging structure 184 fixedly connected to the washer portion 182. The washer portion 182 aligns with the through hole 1424 and is disposed on the pivotal connection portion 142. The second engaging structure 184 passes through the through hole 1424 to engage with the first engaging structure 128. The threaded fastener 20 presses against the washer portion 182 and passes through the washer portion 182 and the through hole 1424 to engage with the threaded structure 126, so as to prevent the shaft socket 1422 from departing from the protruding shaft 124 (i.e. prevent the first support 12 from disengaging from the second support 14); that is, the second support 14 is positioned in the first rotation axis A1.

Therein, by the structural engagement of the first engaging structure 128 with the second engaging structure 184, the fixed washer 18 and the protruding shaft 124 (or the wear-resistant sleeve 1244 thereof) are fixed together relative to the first rotation axis A1 (i.e. they will not relatively rotate relative to the first rotation axis A1), so that when the second support 14 rotates relative to the first support 12, the threaded fastener 20 that presses against the washer portion 182 will not rotate together with the second support 14, so as to remain the positioning effect of the threaded fastener 20 to the second support 14. Furthermore, in the embodiment, the fixed washer 18 as a whole shows a T-shaped post substantially, which passes through the through hole 1424 and the through hole 1244b. The second engaging structure 184 includes two protruding blocks extending perpendicular to the first rotation axis A1 (or protruding outward from the post) and disposed oppositely. The two protruding blocks and the washer portion 182 are located at the two sides of the through hole 1424 in the first rotation axis A1. The first engaging structure 128 and the wear-resistant sleeve 1244 are structurally integrated (e.g. formed in a single part by injection) and includes two recesses that are disposed at the circumference of the through hole 1244b corresponding to the two protruding blocks respectively. One of the recesses is realized by an end of the open slot 1244a; the other recess is realized by an indentation at the side wall of the through hole 1244b. However, it is not limited thereto in practice. For example, the post portion of the fixed washer 18 has a non-circular sectional profile (e.g. profiles of polygons, ellipses and soon) and is regarded as the second engaging structure 184. Correspondingly, the through hole 1244b has a matching non-circular sectional profile (that can produce structural constraint effect in coordination with the fixed washer 18, but not limited to the same profile) and is regarded as the first engaging structure 128 directly. The two structures also can produce a structural engagement to produce an effect like the effect above-mentioned that the fixed washer 18 and the protruding shaft 124 will not relatively rotate relative to the first rotation axis A1. For another example, the first engaging structure 128 having the above matching non-circular sectional profile also can be formed on the shaft body 1242, which also can produce the effect of preventing the relative rotation between the fixed washer 18 and the protruding shaft 124.

In addition, in the embodiment, the threaded structure 126 is realized by a threaded hole, with which the threaded fastener 20 is engaged through a screw rod (i.e. the threaded rod portion 204); however, it is not limited thereto in practice. For example, the threaded structure 126 is realized by a screw rod disposed in a blind hole (e.g. by structurally integrating a screw with the first support 12 in a way of an insert moulding). The threaded fastener 20 includes a post with a threaded hole correspondingly. This post can be inserted into the blind hole to make the screw rod engage with the threaded hole, which also can realize the effect of screwing the threaded fastener 20 onto the first support 12.

Furthermore, in the embodiment, the supporting device 1 further includes a washer 22, which can be a common washer or a spring washer (e.g. but not limited to conical washers, wave washers, split washers and so on), and abuts against and between the washer portion 182 and the threaded fastener 20 so that the threaded fastener 20 presses against the washer portion 182 through the washer 22, as shown by FIG. 2 and FIG. 6. It is convenient for a user to rotate the threaded fastener 20 by use of the washer 22 during the engagement of the threaded fastener 20 with the threaded structure 126 and the disengagement of the threaded fastener 20 from the threaded structure 126. If the washer 22 is realized by a spring washer, the washer 22 when compressed is conducive to maintaining the engagement of the threaded fastener 20 with the threaded structure 126, so as to make the threaded fastener 20 uneasy to be unloosened. For this case, the spring washer can be replaced with a coil spring in practice. Furthermore, in the embodiment, the threaded fastener 20 includes a manipulation portion 202 and a threaded rod portion 204 fixedly connected to the manipulation portion 202 (e.g. in a way of an insert moulding with a screw). The threaded structure 126 is a threaded hole. The threaded rod portion 204 passes through the through hole 1424 and is screwed into the threaded hole. The user can rotate the manipulation portion 202 by hand without tools for performing the engagement of the threaded fastener 20 with the threaded structure 126 and the disengagement of the threaded fastener 20 from the threaded structure 126. In the embodiment, the through hole 1424 is a counterbored hole. The washer portion 182 and the washer 22 are accommodated in the counterbored hole. The manipulation portion 202 is partially accommodated in the counterbored hole and is exposed out of the counterbored hole, which has an aesthetic appearance and convenience of manipulation.

Furthermore, in the embodiment, for simplification of description, the pivotal connection of the first support 12 with the third support 16 is the same as the pivotal connection of the first support 12 with the second support 14, which will not be described in addition. However, it is not limited thereto in practice. For example, the first support 12 and the third support 16 are pivotally connected with each other by a pin joint, or in other ways. Furthermore, as shown by FIG. 1, in the embodiment, the monitor 4 is supported and fixed on the supporting device 1. The position and orientation of the monitor 4 can be adjusted through the supporting device 1. Therein, the first rotation axis A1 is parallel to the second rotation axis A2. The first rotation axis A1 is perpendicular to the third rotation axis A3. The supporting portion 146 further makes adjustment available relative to a fourth rotation axis A4 (also parallel to the first rotation axis A1). Thereby, the user can substantially adjust the position and orientation in the space of the monitor 4 through the supporting device 1. Therein, the geometric relations (including relative positions, angles and so on) between the rotation axes A1, A2, A3 and A4 depend on actual applications, which will not be described in addition. Furthermore, the supporting device 1 of the embodiment is illustrated based on the conditions that the supporting device 1 is fixed on the table edge 3 and supports the monitor 4. However, it is not limited thereto in practice. For example, the supporting device 1 can be fixed and supported on a wall or ground through a proper modification on the supporting device 1 (e.g. modifying an end of the third support 16 to be an anchorage structure or a supporting base). For another example, the supporting device 1 can be used for supporting a carrier (e.g. used as a work platform or used for supporting other devices) through a proper modification on the supporting device 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting device, comprising:
    a first support, the first support having a threaded structure and a first engaging structure, the threaded structure extending along a first rotation axis, the first support comprising a protruding shaft, the protruding shaft comprising a shaft body and a wear-resistant sleeve, the wear-resistant sleeve being fixedly sleeved on the shaft body, the threaded structure being disposed on the shaft body, the first engaging structure being disposed on the wear-resistant sleeve;
    a second support, the second support being pivotally connected to the first support relative to the first rotation axis and having a shaft socket and a through hole, the through hole aligning with the threaded structure and being formed on the shaft socket, the first support and the second support being pivotally connected by sleeving the shaft socket on the wear-resistant sleeve of the protruding shaft;
    a fixed washer, the fixed washer comprising a washer portion and a second engaging structure, the washer portion aligning with the through hole and being disposed on the second support, the second engaging structure passing through the through hole to engage with the first engaging structure; and
    a threaded fastener, the threaded fastener presses against the washer portion and passing through the washer portion and the through hole to engage with the threaded structure; wherein the first engaging structure is a recess, the second engaging structure comprises a protruding block extending perpendicular to the first rotation axis, and the protruding block and the washer portion are located at two sides of the through hole respectively.

2. The supporting device according to claim 1, wherein the through hole is a counterbored hole, the threaded fastener comprises a manipulation portion and a threaded rod portion, the threaded structure is a threaded hole, the threaded rod portion passes through the counterbored hole and is screwed into the threaded hole, and the manipulation portion abuts against the counterbored hole and is exposed out of the counterbored hole.

3. The supporting device according to claim 1, further comprising a second washer abutting against and between the washer portion and the threaded fastener, the threaded fastener presses against the washer portion through the second washer.

4. The supporting device according to claim 1, further comprising a third support pivotally connected to the first support relative to a second rotation axis.

5. The supporting device according to claim 4, wherein the first rotation axis is parallel to the second rotation axis.

6. The supporting device according to claim 1, wherein the second support comprises a pivotal connection portion, a linkage portion, and a supporting portion, the linkage portion connects the pivotal connection portion and the supporting portion and is rotatable relative to the pivotal connection portion around a third rotation axis, the second support is pivotally connected to the first support through the pivotal connection portion, and the supporting portion keeps the same angular posture as the pivotal connection portion through the linkage portion.

7. The supporting device according to claim 1, wherein the first rotation axis is perpendicular to the third rotation axis.

* * * * *